E. W. SUMMERS.
RAILWAY CAR AND TRUCK.
APPLICATION FILED NOV. 13, 1909.

972,286.

Patented Oct. 11, 1910.
2 SHEETS—SHEET 1.

WITNESSES
Fredric Schaefer
Jno Summers

INVENTOR
Edgar W Summers,
By Fred'k W Winter
Attorney.

E. W. SUMMERS.
RAILWAY CAR AND TRUCK.
APPLICATION FILED NOV. 13, 1909.
972,286.
Patented Oct. 11, 1910.
2 SHEETS—SHEET 2.
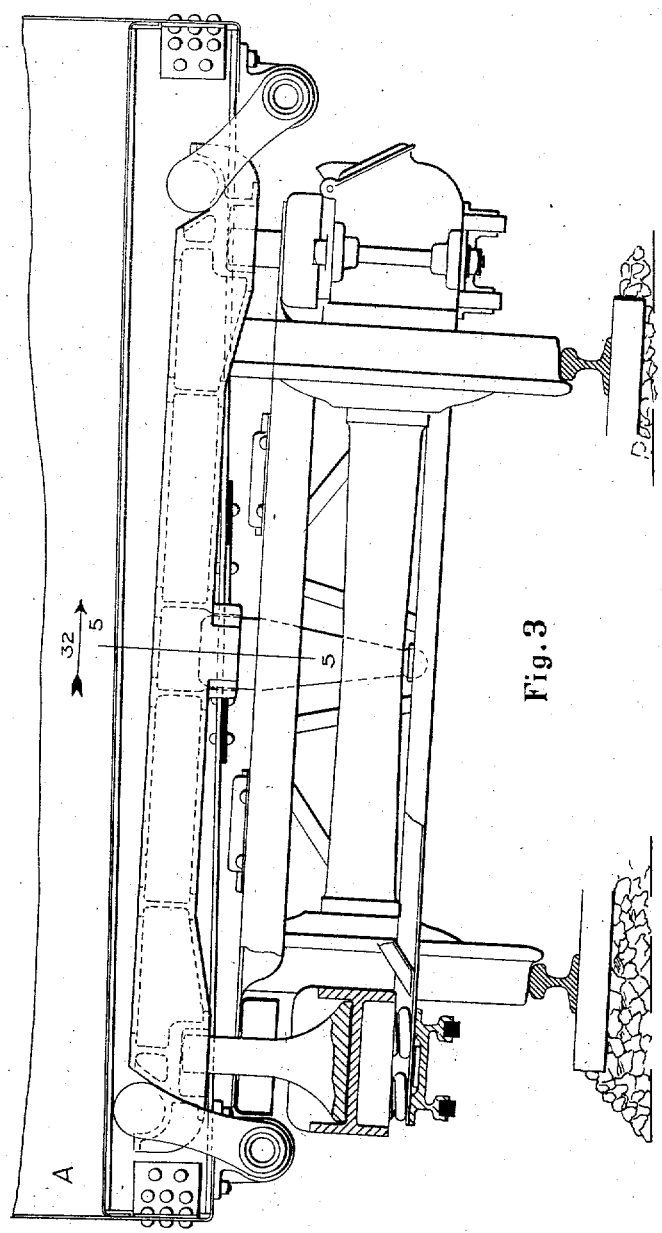
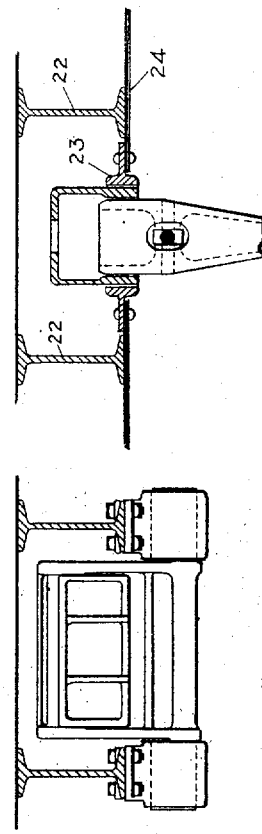
WITNESSES
INVENTOR

UNITED STATES PATENT OFFICE.

EDGAR W. SUMMERS, OF PITTSBURG, PENNSYLVANIA.

RAILWAY CAR AND TRUCK.

972,286.  Specification of Letters Patent.  Patented Oct. 11, 1910.

Application filed November 13, 1909. Serial No. 527,811.

*To all whom it may concern:*

Be it known that I, EDGAR W. SUMMERS, a resident of Pittsburg, in the county of Allegheny and State of Pennsylvania, have invented a new and useful Improvement in Railway Cars and Trucks, of which the following is a specification.

This invention relates to railway cars and more particularly to the trucks and manner of suspending or supporting the car body thereon.

The principal object of the invention is to overcome the tendency of trucks to leave the track when the car body is very rigid and unyielding. This is accomplished by providing equalizing means between the truck frame and car body so arranged that when the truck frame tips as it does on an inclined track the side of the car body on the highest side of the truck is allowed to drop relatively to the truck frame while the opposite side is elevated relatively to the truck frame, the car body shifting slightly laterally of the truck and tending to preserve an upright position.

A further feature of the invention consists in preventing the sudden sidewise movement of the trucks due to inequalities in the track from being communicated directly to the car body, thereby making a smoother riding car and relieving the car body and truck from severe strains.

The invention also consists in other details of construction and arrangement as will hereinafter be described and claimed.

Figure 1:
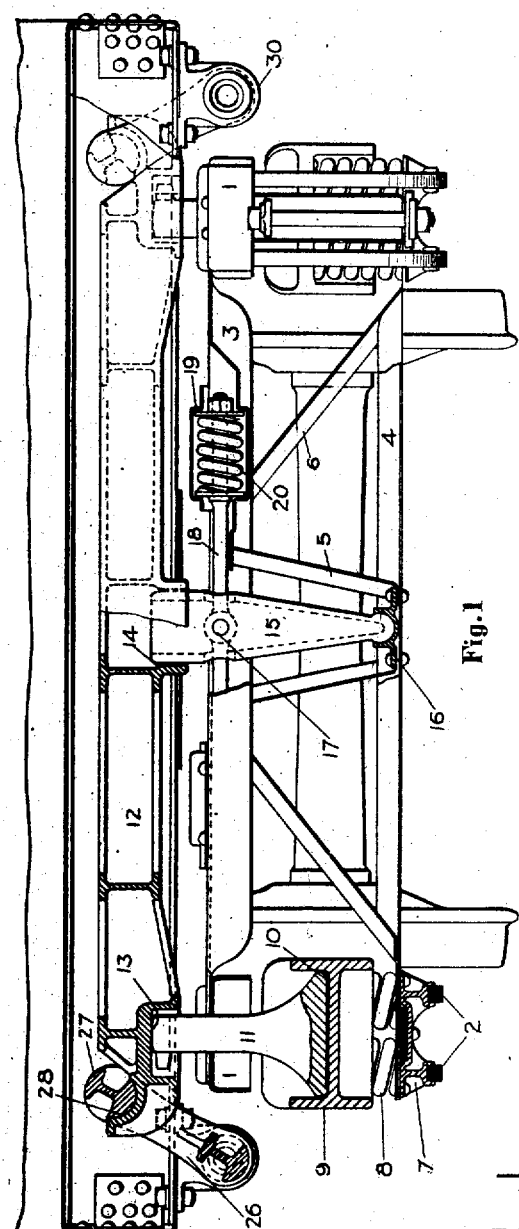
Figure 2:
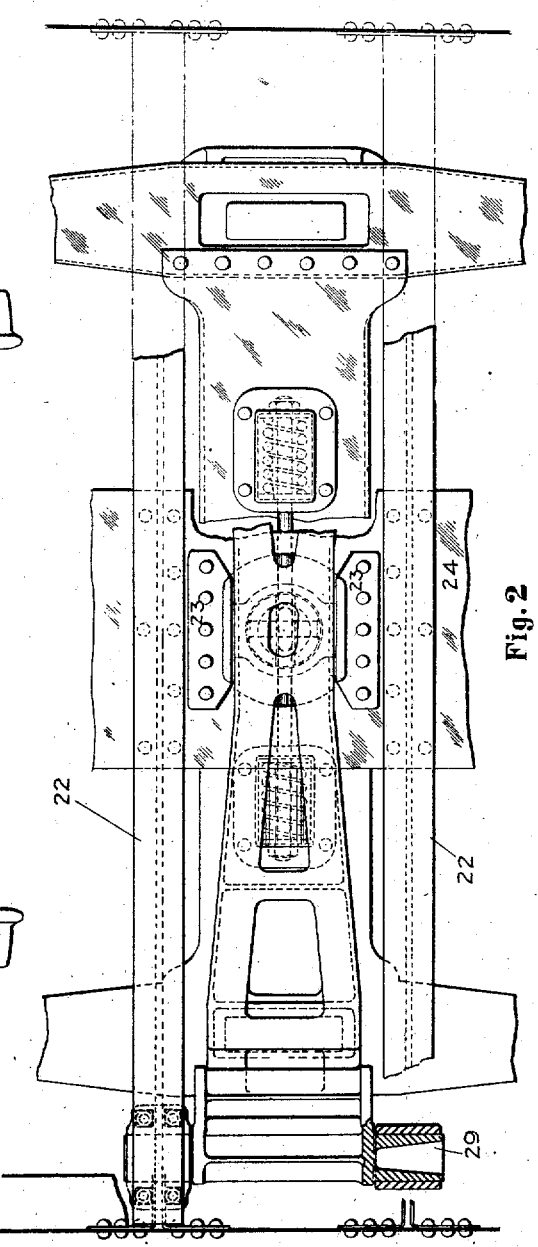

In the accompanying drawings Figure 1 shows partly in end elevation and partly in vertical transverse section a truck and a portion of the car body with the equalizing means between the truck and car body; Fig. 2 is in part a horizontal section and in part a vertical plan view of a portion of the underframe of a car body and the truck frame; Fig. 3 is a view corresponding somewhat to Fig. 1 showing the parts in a different position; Fig. 4 is a detail view showing the floating body bolster and one of the hangers in end elevation and the car body floor beams in cross-section; and Fig. 5 is a detail sectional view on the line 5—5, Fig. 3.

The truck frame may be of any suitable construction arranged to carry the entire live load of the car body on the side bearings substantially as described and claimed in my Patent No. 740,605, granted October 6, 1903.
The truck frame illustrated is in its essentials the same, although different in detail, as that described in my patent aforesaid. The truck frame illustrated comprises side frames composed of a top member or chord 1 and bottom member or chord consisting of two tension rods 2, said chords being united at their ends and spaced apart intermediate their ends. These side frames are connected by a transom comprising the top member 3 riveted to the top chords of the side frames and a bottom member 4 connected to the top member by diagonal members 5 and 6 and also serving as a spring plank, the ends of said transom member 4 resting on castings 7 supported by the bottom chord members 2 of the side frames. The ends of the member 4 also form seats upon which rest the springs 8. Resting on the springs are spring caps 9 each provided with a socket or seat 10 in which is supported the segmental roller side bearing 11, the entire live load of the car body resting on these segmental roller side bearings as described in my patent aforesaid.

In the present instance instead of having the frame of the car body resting directly upon the segmental roller side bearings 11 I interpose between the same suitable equalizing mechanism and a member 12 which I term a floating body bolster. This member 12 is shown as a casting provided near its ends on its bottom face with seats 13 for the upper ends of the segmental roller side bearing members 11. Intermediate its ends this floating body bolster is provided with a hole or socket 14 for loosely receiving the upper end of pivot or king pin 15.

In my patent aforesaid the pivot or king pin is rigidly attached to the truck transom, but in the present case it is mounted to yield transversely of the truck. This is effected by making the king pin quite long and having its lower end rounded and set in a corresponding socket 16 on the lower member 4 of the transom. Extending horizontally through the pivot or king pin and pivotally connected thereto at 17 is a rod 18 whose ends extend into spring cases 19 secured to the top member 3 of the transom and containing spiral springs 20 surrounding the rod 18 and serving as yielding means against endwise movement of said rod. These springs allow the upper end of the pivot or king pin 15 to yield transversely of the truck or track. When the floating bolster moves endwise the roller side bearing members 11 rock in the direction of movement of the bolster, such rocking movement being permitted by the yielding support offered by the springs 8. The consequence is that any sudden sidewise movement of the truck due to inequalities in the track merely causes the pivot pin to yield laterally slightly and is not communicated to the car body. As a consequence the car rides easier and the parts are subjected to less strain than in the case of a rigid pivot or king pin.

The floating bolster 12 is shown located between two transom floor beams 22 of the car body, and is held against movement longitudinally of the car body by means of guide members 23 secured to a plate 24 riveted to the underface of the transverse floor beams and having an opening therethrough through which the pivot or king pin 15 projects. The consequence is that the floating bolster 12 swivels on the truck, or in other words it is rotatively stationary with reference to the car body and rotatively movable relative to the truck, and therefore is in effect a body rather than a truck bolster. The equalizing mechanism is arranged between this floating body bolster and the car body. As shown the equalizing mechanism comprises a pair of stirrups or hangers 26 each having rounded upper members 27 resting in corresponding sockets or seats 28 in the upper face at the ends of the floating body bolster 12, and at their lower ends being provided with trunnions 29 entering suitable bearing members 30 secured to the lower face of the transverse floor beams 22. These equalizing hangers 26 are oppositely inclined so that when the car is running on a level track and the body is upright the position of the parts are as shown in Fig. 1. If now the car runs onto a twisted or winding track where one of the trucks is inclined or tipped and the other substantially level, or one truck tipped in one direction and the other tipped in the other direction, then the parts assume the position shown in Fig. 3; that is to say, the car body by reason of its tendency to maintain an upright position shifts slightly transversely to the truck, or in the direction of the arrow shown at 32, Fig. 3. The consequence is that the equalizing hanger on the side A, that is, the side where the truck frame is highest, lies more nearly in a direct vertical position, while the equalizing hangers on the opposite side of the car swings to a still greater angle from the vertical, as shown. The consequence is that the car body on the side A, drops relatively to the truck frame while the opposite side is relatively elevated. The consequence is that the car body maintains a relatively level or upright position irrespective of the tipping of the truck. In case the truck wheels meet a sudden vertical inequality in the track when the train is in rapid motion the tipping of the truck due to such inequality may not produce a sidewise shifting of the car body on account of the inertia of the latter, and particularly if such inequality exists for only a short distance. But in such case the floating bolster moves endwise and allows the equalizing hangers to assume the positions above described, and said bolster again returns to central position before the inertia of the body can be overcome. This is of great importance in preventing derailment of trucks with car bodies having a frame or platform which is very rigid or unyielding. Wooden car frames are quite yielding and consequently adapt themselves quite readily to inequalities in the track. In other words, when a wooden car passes over a winding or twisted track the car frame as a whole tends to twist or adjust itself to the tipped positions of the trucks. With the introduction of very rigid metal frames, however, difficulty has been experienced in keeping the trucks from leaving a winding or twisted track. This is due to the fact that when one or both of the trucks tip the car frame or platform does not yield or twist so that the entire load of the car is thrown upon diagonally opposite truck side frames. The result is that each truck on one side is almost entirely relieved of load while on the opposite side it is subjected to very heavy load on outside bearings, that is, bearings outside of the wheels, and as a consequence the wheels on the light side tend to jump and run off the track. This has been shown in the actual use of metal railway cars having very rigid frames, and the cause is as above stated. With my equalizers this is largely overcome for the reason that the car body is allowed to shift and transfer a portion of the load from one side to the other and maintain an approximately equal load on both side frames of each truck, and therefore the truck wheels on any one side are not sufficiently relieved of load to permit them to jump and leave the track. These equalizers also operate when a car goes rapidly around a curve. In this case the centrifugal force tends to move the car body outwardly with reference to the curve and increases the natural inclination of the car body, tipping the top outwardly. With my equalizers, however, the top of the car is thrown inwardly and the bottom outwardly, so that the car body is somewhat righted and maintains a position more nearly that of a car going around a curve having its outer rail elevated, and the car has an inward inclination directly proportional to the centrifugal force.

While the form of equalizers shown and described are found to very advantageously effect the purpose for which they are intended, and I believe are the best embodiment therefor, I am sensible that other arrangements of mechanism for effecting the same purpose can be made and therefore wish it understood that the terms of the claims hereinafter made are not to be limited by the specific construction and arrangement described and illustrated. In all cases, however, the equalizing means requires members on the two sides of the cars which are oppositely inclined, whether such members are in the form of hangers or stirrups, or of upwardly projecting supports, or merely oppositely inclined surfaces. All such modifications are intended to be included within the terms of claims hereinafter made.

What I claim is:

1. In a railway car the combination of a truck, a bolster pivotally supported on said truck, a car body, and connections between said bolster and car body arranged on the tipping of the truck to shift the car body laterally with reference to the truck and tending to equalize the load on the two sides of the truck.

2. In a railway car the combination of a truck, a bolster pivotally supported on said truck, a car body, and connections between the car body and said bolster, said connections including oppositely inclined members arranged on the tipping of the truck to shift the car body laterally and tending to equalize the load on the two sides of the truck.

3. In a railway car the combination of a truck frame, a car body bolster supported on said truck frame, and equalizers between the car body and said bolster including oppositely inclined members arranged when the truck tips to shift the car body laterally and lower one side thereof while lifting the opposite side.

4. In a railway car the combination of a truck frame, a floating body bolster supported on the truck frame, and equalizing mechanism supporting the car body from said floating bolster and comprising oppositely inclined members.

5. In a railway car the combination of a truck frame, a floating body bolster supported by the truck frame and having a pivotal or swivel connection therewith, and equalizing mechanism supporting the car body from said floating bolster and including oppositely inclined members.

6. In a railway car the combination of a truck frame, a floating body bolster supported on side bearings on said truck frame, and equalizers between the car body and said floating bolster including oppositely inclined members.

7. In a railway car the combination of a truck frame, a floating bolster supported on side bearings on the truck frame and having a pivoted or swivel connection with said truck frame, and equalizing mechanism between said floating bolster and the car body and including oppositely inclined members.

8. In a railway car the combination of a truck frame, a car body, and unyielding supporting connections between the truck and car body and including oppositely inclined members having pivotal connections at both their upper and lower ends.

9. In a railway car the combination of a truck frame, a floating body bolster supported on side bearings on the truck frame, and oppositely inclined members pivotally connected at one of their ends to the car body and at their opposite ends to said floating bolster.

10. A railway car the combination of a truck frame, a floating body bolster supported on side bearings on the truck frame and having a pivotal connection therewith, and oppositely inclined members between the ends of the floating bolster and car body and pivotally connected to both.

11. A car truck comprising side frames and connecting transoms, roller bearings in the side frames, a pivot or king pin mounted on the transom and arranged to yield transversely of the truck, in combination with a car body supported solely on the truck side bearings and provided with a member having a socket loosely receiving the pivot or king pin.

12. A truck frame comprising side frames and connecting transoms, roller bearings in the side frames, a pivot or king pin mounted on the truck frame and movable transversely thereof, and rods and springs arranged to yieldingly restrain the king pin against movement, in combination with a car body provided with members resting directly on the truck roller bearings and with a socket loosely receiving said pivot or king pin.

13. A car truck comprising side frames and connecting transom, roller bearings in the side frames, a pivot or king pin in the truck transom and pivotally mounted at its lower end and having its upper end movable transversely of the truck frame, and springs arranged to restrain the lateral movement of the upper end of said king pin, in combination with a car body provided with members resting directly on the truck roller bearings and with a socket loosely receiving said pivot or king pin.

14. In a railway car the combination of a truck, a car body having bearings on the truck outside of the wheels, the connections between said body and truck being unyielding and arranged on tipping of the truck to shift the car body laterally with reference to the truck and transfer a portion of the load from the high side of the truck to the low side thereof.

15. In a railway car the combination of a truck, a car body having bearings on the truck outside of the wheels, connections between said body and truck including unyielding oppositely inclined members arranged on tipping of the truck to shift the car body laterally with reference to the truck and transfer a portion of the load from the high side of the truck to the low side thereof.

16. In a railway car the combination of a truck frame, a car body supported on side bearings on the truck frame, and unyielding equalizing mechanism between the car body and truck frame arranged on tipping of the truck to shift the car body laterally with reference to the truck and transfer a portion of the load from the high side of the truck to the low side thereof.

17. In a railway car the combination of a truck frame, a car body supported on side bearings on said truck frame, and equalizing mechanism between the car body and truck frame and including oppositely inclined members arranged on tipping of the truck to shift the car body laterally with reference to the truck and transfer a portion of the load from the high side of the truck to the low side thereof.

18. In a railway car the combination of a truck frame, a floating bolster supported on said truck frame, and equalizing mechanism supporting the car body from said floating bolster and arranged on the tipping of the truck to shift the car body laterally with reference to the truck and transfer a portion of the load from the high side of the truck to the low side thereof.

19. In a railway car the combination of a truck frame, a floating bolster supported on side bearings on said truck frame, and equalizing mechanism between the car body and said floating bolster arranged on the tipping of the truck to shift the car body laterally with reference to the truck and transfer a portion of the load from the high side of the truck to the low side thereof.

20. In a railway car the combination of a truck a floating bolster supported on bearings outside of the wheels, and equalizing mechanism between the car body and said floating bolster arranged on the tipping of the truck to shift the car body laterally with reference to the truck and to transfer a portion of the load from the high side of the truck to the low side thereof.

21. In a railway car the combination of a truck frame, a floating bolster supported on side bearings on the truck frame and having a pivotal or swivel connection therewith, and equalizing mechanism between said floating bolster and the car body arranged when the truck tips to shift the car body laterally with reference to the truck and to transfer a portion of the load from the high side of the truck to the low side thereof.

22. In a railway car the combination of a truck frame, a floating bolster supported on said truck frame so as to have endwise movement, and equalizing mechanism supporting the car body from said floating bolster and arranged on tipping of the truck to tend to maintain the body level and move said bolster endwise.

23. In a railway car the combination of a truck frame, a floating bolster supported on said truck frame so as to have endwise movement, equalizing mechanism supporting the car body from said floating bolster and arranged on tipping of the truck to tend to maintain the body level and move the bolster endwise, and yielding means for normally centering said bolster endwise.

24. In a railway car the combination of a truck frame, a floating bolster supported on said truck frame so as to have endwise movement, and equalizing mechanism including pivotally inclined members supporting the car body from said floating bolster and arranged on tipping of the truck to tend to maintain the body level and move the bolster endwise.

25. In a railway car the combination of a truck frame, a floating bolster supported on said truck frame so as to have endwise movement and also have pivotal movement relative to the truck, and equalizing mechanism supporting the car body from said floating bolster and arranged on tipping of the truck to tend to maintain the body level and move the bolster endwise.

26. In a railway car the combination of a truck frame, a car body, a floating bolster mounted on said truck frame and supporting the car body and having endwise movement relative to both the truck frame and car body, and means for normally centering said bolster endwise.

27. In a railway car the combination of a truck frame, a car body, a floating bolster mounted on said truck frame and supporting the car body and having endwise movement relative to both the truck frame and car body, and yielding means normally restraining endwise movement of said bolster.

28. In a railway car the combination of a truck frame, a car body, a floating bolster mounted on said truck frame and supporting the car body, said bolster having endwise movement relative to both the truck frame and car body and pivotal movement relative to the truck frame, and means for normally centering said bolster endwise.

29. In a railway car the combination of a truck frame, a floating bolster supported on said truck frame so as to have endwise movement, yielding means for normally entering said bolster endwise, and equalizing mechanism including oppositely inclined members supporting the car body from said floating bolster and arranged on tipping of the truck to tend to maintain the body level and move the bolster endwise.

30. In a railway car the combination of a truck, a car body, and an endwise movable bolster, side bearings, and equalizing mechanism between the truck and the car body, said equalizing mechanism comprising oppositely inclined members so arranged that when the truck tips said members tend to maintain the car body level.

In testimony whereof, I have hereunto set my hand.

EDGAR W. SUMMERS.

Witnesses:
F. W. WINTER,
JAS. L. WELDON.

---

Correction in Letters Patent No. 972,286.

It is hereby certified that in Letters Patent No. 972,286, granted October 11, 1910, upon the application of Edgar W. Summers, of Pittsburg, Pennsylvania, for an improvement in "Railway Cars and Trucks," an error appears in the printed specification requiring correction as follows: Page 5, line 15, the word "entering" should read *centering;* and that the said Letters Patent should be read with this correction therein that the same may conform to the record of the case in the Patent Office.

Signed and sealed this 15th day of November, A. D., 1910.

[SEAL.]

E. B. MOORE,

*Commissioner of Patents.* relative to both the truck frame and car body, and yielding means normally restraining endwise movement of said bolster.

28. In a railway car the combination of a truck frame, a car body, a floating bolster mounted on said truck frame and supporting the car body, said bolster having endwise movement relative to both the truck frame and car body and pivotal movement relative to the truck frame, and means for normally centering said bolster endwise.

29. In a railway car the combination of a truck frame, a floating bolster supported on said truck frame so as to have endwise movement, yielding means for normally entering said bolster endwise, and equalizing mechanism including oppositely inclined members supporting the car body from said floating bolster and arranged on tipping of the truck to tend to maintain the body level and move the bolster endwise.

30. In a railway car the combination of a truck, a car body, and an endwise movable bolster, side bearings, and equalizing mechanism between the truck and the car body, said equalizing mechanism comprising oppositely inclined members so arranged that when the truck tips said members tend to maintain the car body level.

In testimony whereof, I have hereunto set my hand.

EDGAR W. SUMMERS.

Witnesses:
F. W. WINTER,
JAS. L. WELDON.

---

Correction in Letters Patent No. 972,286.

It is hereby certified that in Letters Patent No. 972,286, granted October 11, 1910, upon the application of Edgar W. Summers, of Pittsburg, Pennsylvania, for an improvement in "Railway Cars and Trucks," an error appears in the printed specification requiring correction as follows: Page 5, line 15, the word "entering" should read *centering;* and that the said Letters Patent should be read with this correction therein that the same may conform to the record of the case in the Patent Office.

Signed and sealed this 15th day of November, A. D., 1910.

[SEAL.]

E. B. MOORE,

*Commissioner of Patents.*

It is hereby certified that in Letters Patent No. 972,286, granted October 11, 1910, upon the application of Edgar W. Summers, of Pittsburg, Pennsylvania, for an improvement in "Railway Cars and Trucks," an error appears in the printed specification requiring correction as follows: Page 5, line 15, the word "entering" should read *centering;* and that the said Letters Patent should be read with this correction therein that the same may conform to the record of the case in the Patent Office.

Signed and sealed this 15th day of November, A. D., 1910.

[SEAL.]

E. B. MOORE,

*Commissioner of Patents.*